United States Patent
Sutcu et al.

(10) Patent No.: US 8,001,787 B2
(45) Date of Patent: Aug. 23, 2011

(54) TRANSITION SUPPORT SYSTEM FOR COMBUSTION TRANSITION DUCTS FOR TURBINE ENGINES

(75) Inventors: Maz Sutcu, Oviedo, FL (US); Bradley T. Youngblood, Oviedo, FL (US); Robert W. Dawson, Oviedo, FL (US); Ricardo F. Moraes, Orlando, FL (US); James M. Zborovsky, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1071 days.

(21) Appl. No.: 11/711,823

(22) Filed: Feb. 27, 2007

(65) Prior Publication Data

US 2008/0202124 A1    Aug. 28, 2008

(51) Int. Cl.
*F02C 1/00*    (2006.01)
*F02G 3/00*    (2006.01)
(52) U.S. Cl. .......................... 60/752; 60/796
(58) Field of Classification Search ............. 60/796, 60/800, 39.37, 752–76
See application file for complete search history.

(56) References Cited

U.S. PATENT DOCUMENTS

| | | |
|---|---|---|
| 2,702,454 A | 2/1955 | Brown |
| 3,024,969 A | 3/1962 | Russell |
| 4,016,718 A | 4/1977 | Lauck |
| 4,191,011 A | 3/1980 | Sweeney et al. |
| 4,411,134 A | 10/1983 | Moir |
| 4,465,284 A | 8/1984 | Szema |
| 5,180,282 A | 1/1993 | Lenhart et al. |
| 5,414,999 A | 5/1995 | Barnes |
| 5,572,863 A | 11/1996 | Wrightham et al. |
| 6,116,013 A | 9/2000 | Moller |
| 6,450,762 B1 | 9/2002 | Munshi |
| 6,619,030 B1 | 9/2003 | Seda et al. |
| 6,640,547 B2 | 11/2003 | Leahy, Jr. |
| 6,644,032 B1 | 11/2003 | Jorgensen et al. |
| 6,988,369 B2 * | 1/2006 | Conete et al. .............. 60/796 |
| 2005/0047907 A1 | 3/2005 | Nordlund |
| 2005/0252194 A1 | 11/2005 | Orlando et al. |
| 2006/0288707 A1 | 12/2006 | Weaver et al. |

FOREIGN PATENT DOCUMENTS

| | | |
|---|---|---|
| EP | 1143107 A2 | 10/2001 |
| EP | 1752612 A1 | 2/2007 |

* cited by examiner

*Primary Examiner* — Louis J. Casaregola
*Assistant Examiner* — Andrew Nguyen

(57) ABSTRACT

A transition duct support system for a transition duct that channels hot gases from a combustor exit to a gas turbine inlet of a turbine engine. The transition duct support system includes a transition support frame formed from a body positioned around a transition duct body at an outlet transition section. The transition support frame may include a first inner surface aligned with and positioned proximate to portion of the outlet transition section that is positioned at an oblique angle relative to the outer wall of the transition duct body to limit linear movement of the transition duct body in a first direction. The transition support frame may also include a second inner surface positioned at an oblique angle to limit linear movement of the transition duct body in a second direction opposite the first direction.

17 Claims, 5 Drawing Sheets

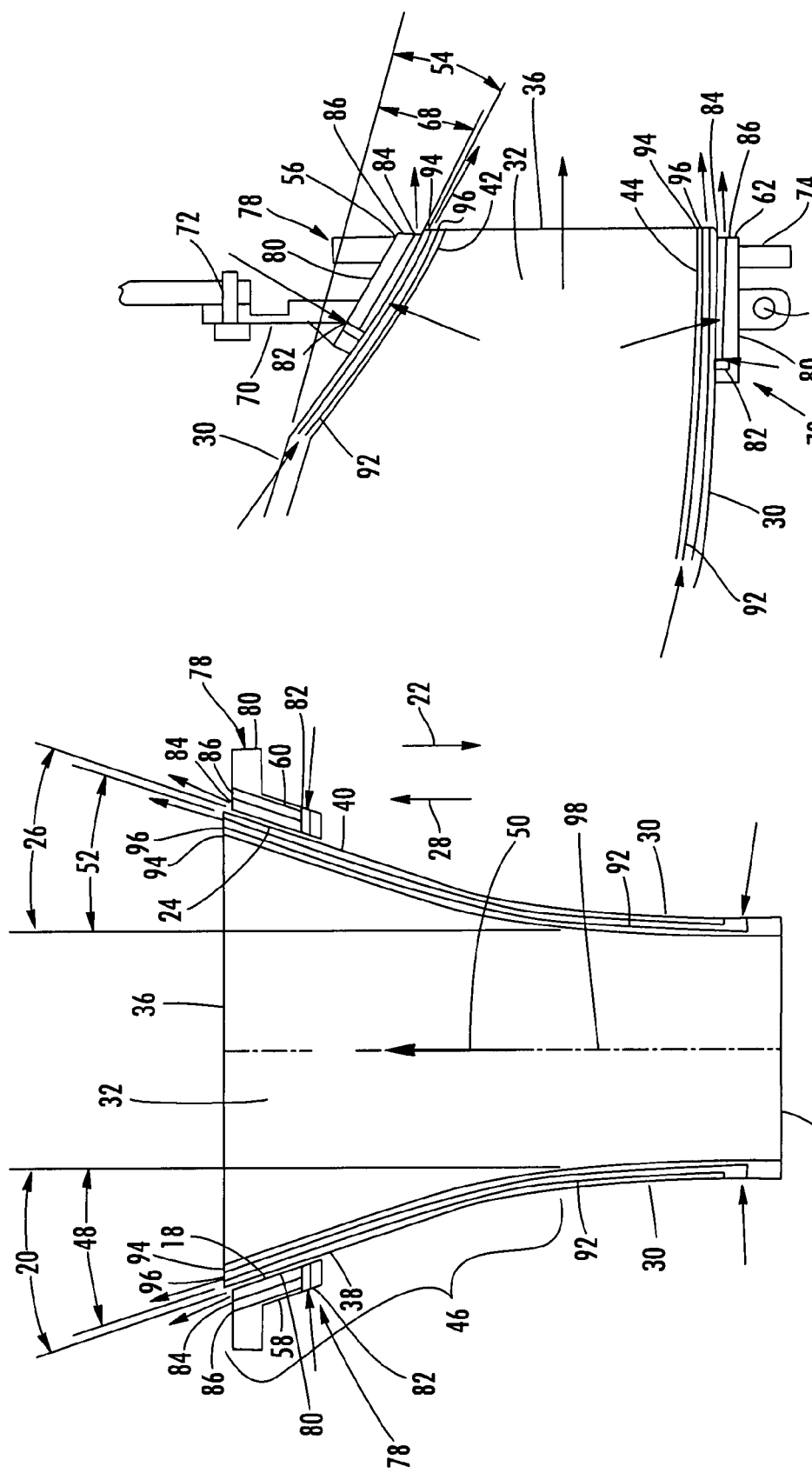

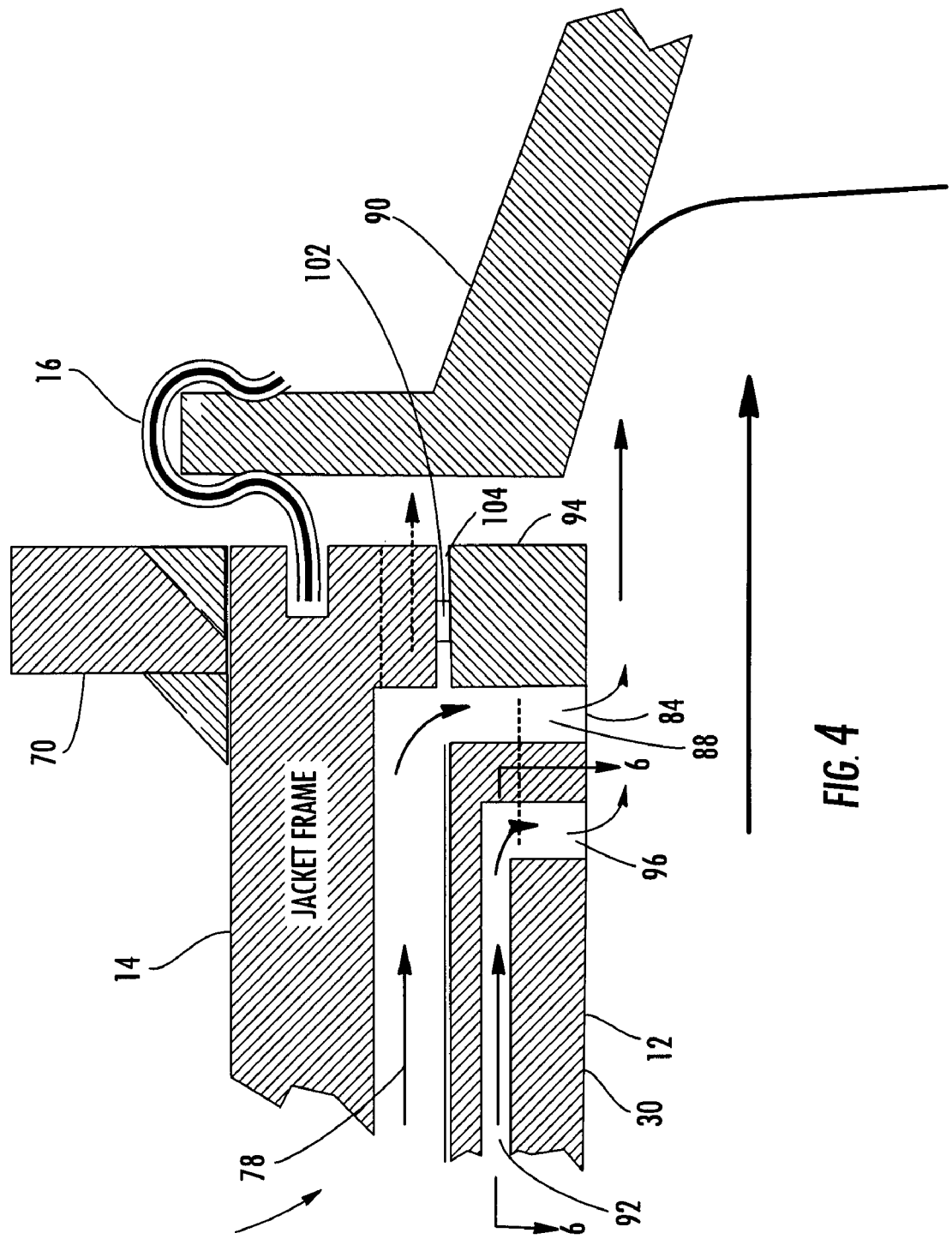

TRANSITION SUPPORT SYSTEM FOR COMBUSTION TRANSITION DUCTS FOR TURBINE ENGINES

FIELD OF THE INVENTION

The invention relates in general to combustion turbine engines and, more specifically, to transition ducts for routing combustor exhaust gas flow from combustors to a turbine assembly of a combustion turbine engine.

BACKGROUND OF THE INVENTION

Typically, gas turbine engines include a compressor for compressing air, a combustor for mixing the compressed air with fuel and igniting the mixture, and a turbine blade assembly for producing power. Transition ducts extend between a combustor and a turbine blade assembly to direct combustor gases through the turbine blade assembly to impart rotational movement on the rotor of the turbine blade assembly. Conventional transition ducts are typically formed from a plenum that requires support from more rigid mounting support structure at the exit that is welded to the plenum. The rigid support structure is used for affixing the transition assembly to the turbine inlet. This rigid support structure is also used to support the exit seals that are used to prevent cold compressed air from entering into the turbine directly.

During operation, gas turbine engines operate at high temperatures and expose the transition ducts to hot combustion gases. As such, the welded joints that connect the transition ducts to the turbine inlet are exposed to hot gases and undergo thermal expansion. In addition, the welded joints connecting the transition ducts to the turbine inlet experience vibrations throughout ramp up and steady state operating conditions. The repeated thermal expansion and vibrations that are imparted onto the welded joints increases the likelihood that the joint will fail and jeopardize the integrity of the turbine engine. Thus, a need exists for a more secure system of attaching a transition duct to a turbine inlet of a turbine engine.

SUMMARY OF THE INVENTION

This invention is directed to a transition duct support system for a transition duct that channels hot combustor exhaust gases from a combustor exit to a gas turbine inlet of a turbine engine. The transition duct support system provides a durable support system for supporting a transition duct at an outlet of the duct. The transition duct support system includes a transition support frame configured to retain a transition duct in an aligned position with a gas turbine inlet and in contact with transition exit seals to seal the transition duct to the gas turbine inlet. The transition support frame is configured to absorb axial movement, such as vibrations, without causing structural damage as is often the case with conventional rigid attachments, such as welds. The transition support frame may include a first inner surface positioned at another oblique angle for preventing axial movement in a first direction and a second inner surface positioned at an oblique angle for preventing movement in a second direction generally opposite to the first direction. In one embodiment, the first and second directions may be opposite to each other and generally aligned with a flow path of the transition duct. Thus, the transition support frame may prevent axial movement in the upstream and downstream directions.

The transition duct support system may be formed from a transition duct that channels hot gases from a combustor exit to a gas turbine inlet of a turbine engine. The transition duct may be formed from a transition duct body formed from an outer wall that forms an internal passage extending between an inlet and an outlet of the transition duct body. The transition duct body may include an outlet transition section at the outlet in which at least a portion of the outlet transition section is positioned at an oblique angle relative to the outer wall of the transition duct body. A transition support frame may be formed from a body positioned around the transition duct body at the outlet transition section. The transition support frame may include at least one inner surface aligned with and positioned proximate to the portion of the outlet transition section that is positioned at an oblique angle relative to the outer wall of the transition duct body to limit linear movement of the transition duct body.

In one embodiment, a portion of the outlet transition section of the transition duct positioned at an oblique angle relative to the outer wall of the transition duct body may be formed from a first wall positioned at a first oblique angle relative to the outer wall of the transition duct body and a second wall positioned at a second oblique angle relative to the outer wall of the transition duct body. The first wall may be positioned at an oblique angle between 50 degrees and greater than zero degrees relative to a longitudinal axis. The first wall of the outlet transition section of the transition duct body may be positioned at an oblique angle extending generally away from a longitudinal axis of a flow path of the transition duct body, and the second wall of the outlet transition section of the transition duct body may be positioned at an oblique angle extending generally toward the longitudinal axis of the flow path of the transition duct body. The first wall may be a sidewall of the outlet transition section of the transition duct body, and the second wall may be a radially outer wall of the outlet transition section of the transition duct body. At least one inner surface of the transition support frame may be formed from a first inner surface aligned with and positioned proximate to the first wall of the transition duct body to limit movement in a first direction and a second inner surface aligned with and positioned proximate to the second wall of the transition duct body to limit movement in a second direction that is generally opposite to the first direction.

In one embodiment, the outlet transition section of the transition duct body may be formed from a first sidewall formed from the first wall, a second sidewall opposite to the first sidewall, wherein the second sidewall may be generally aligned with the outer wall of the transition duct body, a radially inner wall extending between the first and second sidewalls at a radially innermost region of the outlet and generally aligned with the outer wall of the transition duct body. The radially outer wall may extend between the first and second sidewalls at a radially outermost region of the outlet and may be generally aligned with the outer wall of the transition duct body. In another embodiment, the second sidewall may be positioned at an oblique angle relative to the outer wall of the transition duct body. The second sidewall may extend at an oblique angle in a direction away from the first sidewall. In one embodiment, the outlet of the transition duct body may extend axially downstream from the transition support frame such that the outlet of the transition duct body is positioned axially downstream from the transition support frame to provide heat shielding of downstream transition exit seals.

The transition duct support system may also include a cooling system formed from at least one cooling channel in the transition support frame. The at least one cooling channel may extend axially along a radially inner surface of the transition support frame and may include at least one inlet in a radially outer surface. The at least one cooling channel may include an outlet in an inner surface of the transition support frame. In another embodiment, the at least one cooling channel may include an outlet in an end surface of the transition support frame for purge cooling.

The transition duct support system may also include at least one cooling channel extending along the transition duct body in the outer wall forming the transition duct body. The at least one cooling channel extending along the transition duct body in the outer wall forming the transition duct body may include a plurality of cooling channels axially aligned in the transition duct body and having outlets in an inner surface of the transition duct body aligned with orifices in the transition support frame.

The transition duct support system may also include an outer exit rail coupled to and extending radially outwardly from a radially outer wall of the transition support frame. The transition duct support system may also include an inner exit rail coupled to and extending radially inwardly from a radially inner wall of the transition support frame. The outer and inner exit rails may be configured to support the transition support frame.

The transition duct support system may be used to support the transition duct in a more effective manner than in conventional designs. In particular, the transition duct may be supported with the transition support frame. The transition support frame may be attached to a support system of the turbine engine with mechanical connectors inserted through orifices in the outer and inner exit rails. The transition support frame may be formed of two or more pieces. In the embodiment in which the transition support frame is formed of two halves, the transition support frame may be attached around the transition duct with mechanical fasteners, such as welds, bolts, or other appropriate configurations. When a transition duct support system and transition duct are installed into a turbine engine, the transition duct support system and the transition duct may be preloaded such that the outer surfaces of one or more, if not all, of the first and second sidewalls, the radially outer wall and the radially inner wall bear upon the first and second inner surfaces, the radially outer frame wall and the radially inner frame wall of the transition support frame. The transition duct and the transition support frame may be attached to each other via welds, such as, but not limited to, intermittent stitch welds. In this configuration, the stresses that develop during use of the turbine engine may be distributed across the first and second inner surfaces, the radially outer frame wall and the radially inner frame wall of the transition support frame rather than being concentrated at the welds. Distributing the stresses across a larger area than just the welds reduces the likelihood of failure of the welds and thereby increases the useful life of the transition support frame.

An advantage of this invention is that the transition duct support system is configured to retain a transition duct in a proper position relative to a turbine inlet with the shape of the transition duct and transition support frame rather than relying solely on mechanical connectors, such as welds. Such configurations of the duct and support frame reduces the stresses on the support system, thereby reducing the likelihood of failure.

Another advantage of this invention is that the transition duct support system may be configured such that the surrounding transition support frame limits movement of the transition duct in a first direction with a first portion positioned at a first oblique angle and limits movement of the transition duct in a second direction that is generally opposite to the first direction with a second portion positioned at a second oblique angle.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 2 is a cross-sectional view of the transition duct support system taken at line 2-2 in FIG. 1.

FIG. 3 is a cross-sectional view of the transition duct support system taken at line 3-3 in FIG. 1.

FIG. 4 is a cross-sectional view of another embodiment of the transition duct support system taken at line 4-4 in FIG. 1.

DETAILED DESCRIPTION OF EMBODIMENTS OF THE INVENTION

Figure 1:
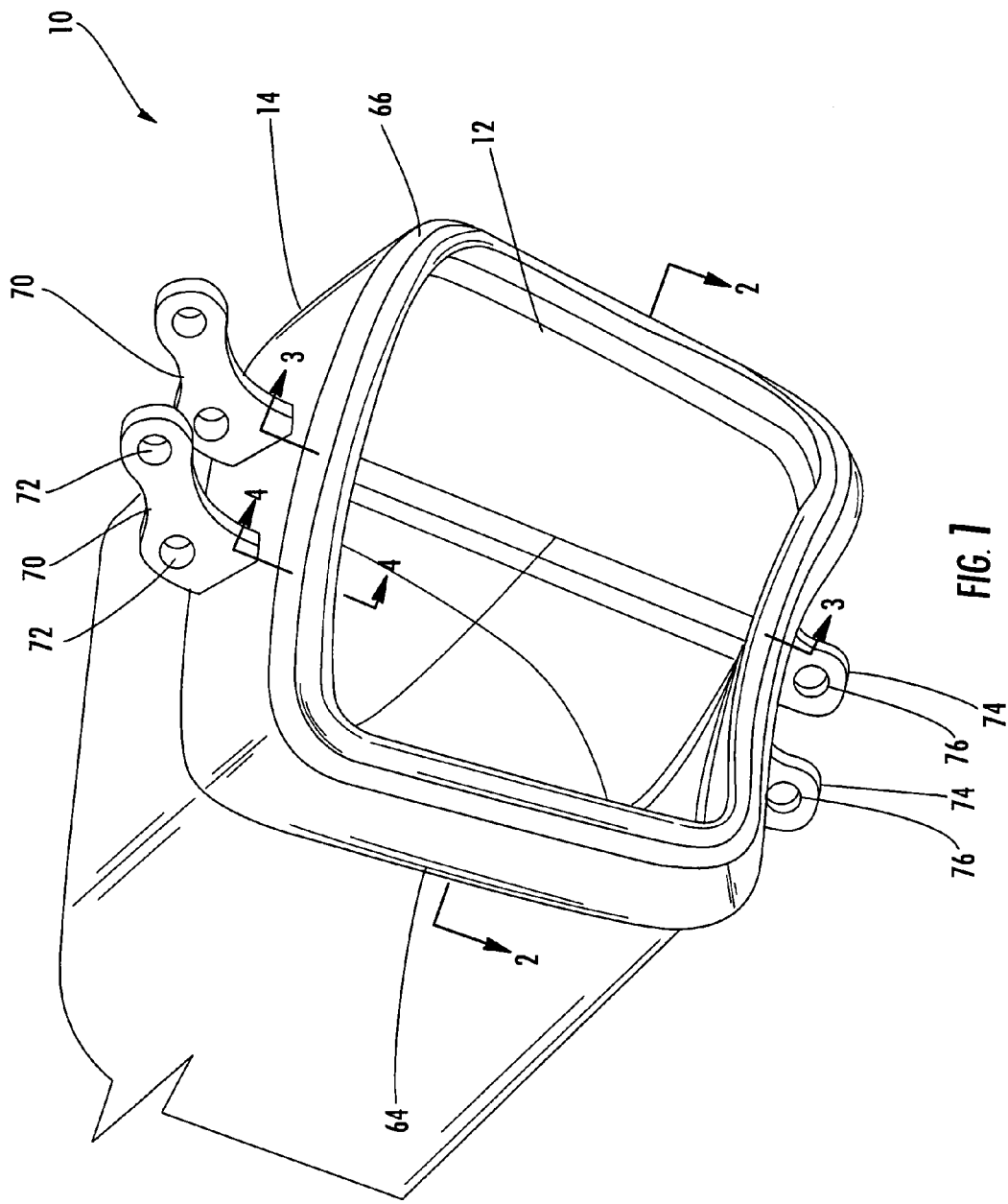
FIG. 1 is a perspective view of the transition duct support system of this invention.

As shown in FIGS. 1-6, this invention is directed to a transition duct support system 10 for a transition duct 12 that channels hot gases from a combustor exit to a gas turbine inlet 90 of a turbine engine in a can annular combustion system. The transition duct support system 10 provides a durable support system for supporting a transition duct 12 at an outlet 36 of the duct 12. The transition duct support system 10 includes a transition support frame 14 configured to retain a transition duct 12 in an aligned position with a gas turbine inlet 90 and in contact with transition exit seals 16 to seal the transition duct 12 to the gas turbine inlet. The transition support frame 14 is configured to absorb axial movement, such as vibrations, without causing structural damage as is often the case with conventional rigid attachments, such as welds. The transition support frame 14 may include a first inner surface 18 positioned at an oblique angle 20 for preventing axial movement in a first direction 22 and a second inner surface 24 positioned at an oblique angle 26 for preventing movement in a second direction 28 generally opposite to the first direction 22.

As shown in FIG. 1, the transition duct support system 10 may support a transition duct body 12 formed from an outer wall 30 that forms an internal passage 32 extending between an inlet 34 and an outlet 36 of the transition duct body 12. The transition duct body 12 may have any shape capable of adequately facilitating transfer of combustion gases from a combustor exit to a turbine inlet 90 of a turbine engine. In one embodiment, the transition duct body 12 may have an outer wall 30 having a generally rectangular cross-section forming the internal passage 32, in which the outer wall 30 forms first and second sidewalls 38, 40, a radially outer wall 42 and a radially inner wall 44.

As shown in FIG. 2, the transition duct body 12 may include an outlet transition section 46 at the outlet 36 in which at least a portion of the outlet transition section 46 is positioned at an oblique angle 48 relative to the outer wall 30 of the transition duct body 12. In one embodiment, one of the sidewalls 38, 40 may be flared outwardly away from a longitudinal axis 98 of a flow path 50 of gases in the transition duct 12. In another embodiment, both the first and second sidewalls 38, 40 may be flared outwardly away from the longitudinal axis 98 of the flow path 50 of gases in the transition duct 12 and away from each other. In particular, the first and second sidewalls 38, 40 may be positioned at oblique angles 48, 52, respectively. Such positions enable the transition support frame 14, as described in detail below, to prevent the transition duct 12 from moving axially in an upstream direction along the flow path 50.

The outlet transition section 46 of the transition duct body 12 may also include a portion that is positioned at an oblique angle 54 relative to the outer wall 30 and directed toward the longitudinal axis 98 of the flow path 50. In such a position, the transition support frame 14 may be used to prevent the transition duct 12 from axial movement in a downstream direction along the flow path 50. In one embodiment, the radially outer wall 42 or the radial inner wall 44 may be positioned at an oblique angle 54 relative to the outer wall 30 and directed toward the flow path 50. The other of the radially outer wall 42 or the radial inner wall 44 may be aligned with the outer wall 30. In another embodiment, both of the radially outer wall 42 or the radial inner wall 44 may be positioned at an oblique angle 54 relative to the outer wall 30 and directed toward the flow path 50. In one embodiment, the oblique angle 54 may be between about 50 degrees and greater than zero degrees.

Figure 5:
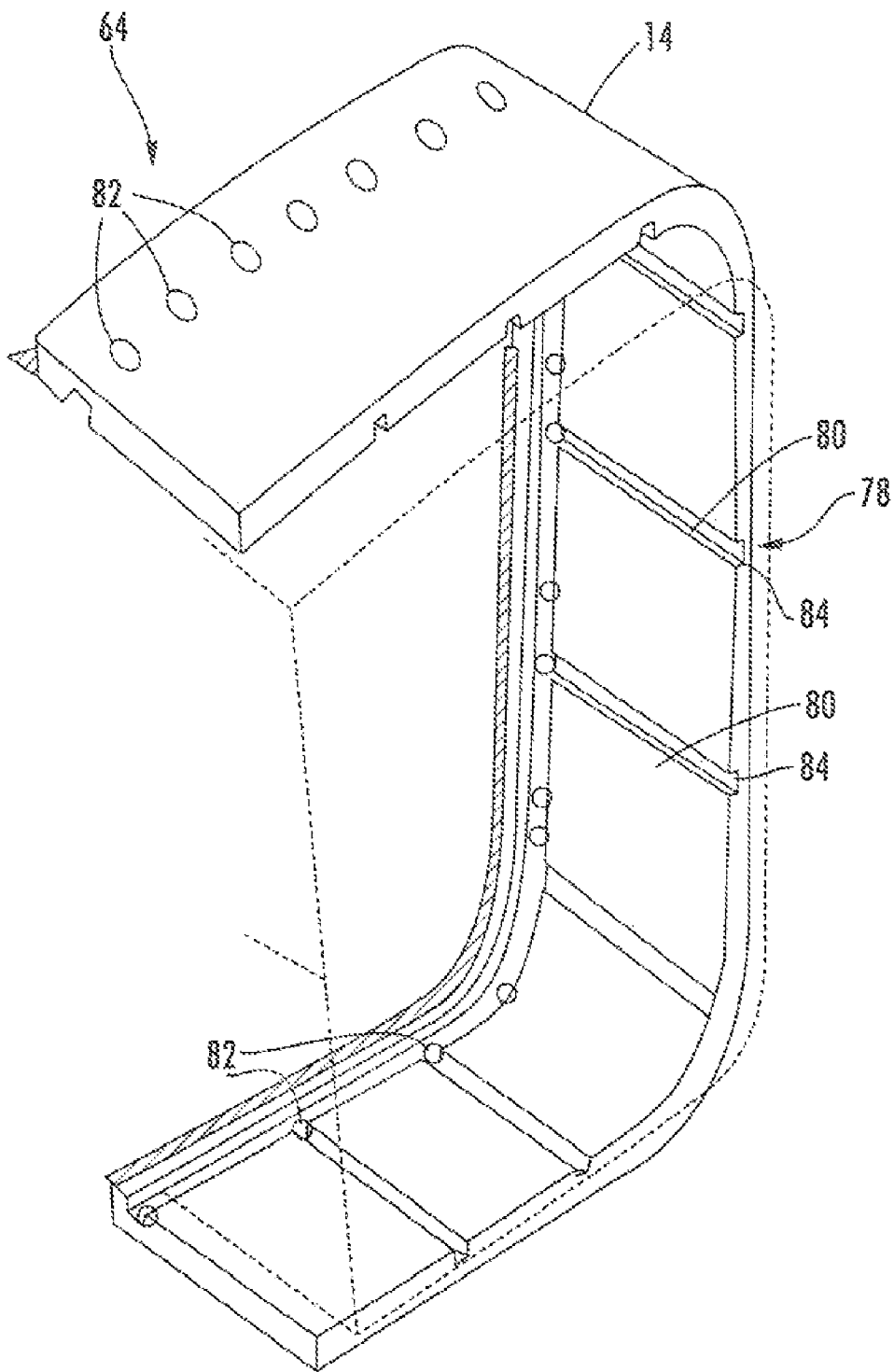
FIG. 5 is a perspective view of a portion of the transition support frame of the transition duct support system.

The transition support frame 14 of the transition duct support system 10 may be configured to be positioned around the outlet transition section 46 of the transition duct body 12. The transition support frame 14 may be formed in a similar shape as the outlet transition section 46. In one embodiment, the transition support frame 14 may include an radially outer frame wall 56, opposed frame sidewalls 58, 60 extending radially inward from the radially outer frame wall 56, and radially inner frame wall 62 extending between radially inner ends of the frame sidewalls 58, 60. In one embodiment, the transition support frame 14 may be formed from two or more sections. As shown in FIGS. 1 and 5, the transition support frame 14 may be bisected into two sections to facilitate installation of the transition support frame 14 on the transition body 12. The first and second sections 64, 66 may be coupled together via a mechanical connection system, such as, but not limited to, mechanical fasteners such as bolts, screws, and welds, and other appropriate devices.

The radially outer frame wall 56, radially inner frame wall 62 and the frame sidewalls 58, 60 of the transition support frame 14 may be aligned with the outlet transition section 46 to limit movement of the transition duct 12. For instance, the frame sidewall 58 may be aligned with the first sidewall 38. In one embodiment, the frame sidewall 58 may include the first inner surface 18 positioned at an oblique angle 20 that is equal to, or nearly equal to, the oblique angle 48 at which the first sidewall 38 of the transition duct body 12 is positioned. The oblique angles 20, 48 may be between about 50 degrees and greater than zero degrees. The frame sidewall 60 may be aligned with the flow path 50. In another embodiment, the frame sidewall 60 may be aligned with the second sidewall 40. In one embodiment, the frame sidewall 60 may include the second inner surface 24 positioned at an oblique angle 26 that is equal to, or nearly equal to, the oblique angle 52 at which the second sidewall 40 of the transition duct body 12 is positioned. The oblique angles 26, 52 may be between about 50 degrees and greater than zero degrees.

The transition duct support system 10 may also be configured with another portion of the transition duct 12 and transition support frame 14 angled to limit, or prevent, movement of the transition duct 12 in a second direction along the flow path 50 that is generally opposite to the first direction. In one embodiment, as shown in FIG. 3, the second direction may be a downstream direction. The radially outer frame wall 56 may be aligned with the radially outer wall 42 and may be positioned at oblique angles 68, 54 toward the flow path 50. The oblique angles 54, 68 may be between about 50 degrees and greater than zero degrees. The radially inner wall 44 and radially inner frame wall 62 may be aligned with each other and both may be aligned with the outer wall 30 of the transition duct 12. In another embodiment, the radially inner wall 44 and radially inner frame wall 62 may be positioned at an oblique angle relative to the outer wall 30 and toward the flow path 50, and the radially outer frame wall 56 may be aligned with the radially outer wall 42 and may be aligned with the outer wall 30 and not angled. In another embodiment, both the combination of the radially outer frame wall 56 and the radially outer wall 42 and the combination of the radially inner wall 44 and radially inner frame wall 62 may be positioned at oblique angles relative to the outer wall 30 and toward the flow path 50.

The transition duct support system 10 may also include an outer exit rail 70 attached to the transition support frame 14 for securing the transition support frame 14 to other support systems of the turbine engine. In one embodiment, the outer exit rail 70 may extending radially outwardly from the radially outer frame wall 56. The outer exit rail 70 may include one or more orifices 72 for securing the transition support frame 14 to other support systems of the turbine engine. The transition duct support system 10 may also include an inner exit rail 74 attached to the transition support frame 14 for securing the transition support frame 14 to other support systems of the turbine engine. The inner exit rail 74 may extend radially inwardly from the radially inner frame wall 62 of the transition support frame 14 to support the transition support frame 14. The inner exit rail 74 may include one or more orifices 76 for securing the transition support frame 14 to other support systems of the turbine engine. The outer and inner exit rails 70, 74 may be secured with bolts or other appropriate connectors.

The transition duct support system 10 may also include a cooling system 78. The cooling system 78 may include one or more cooling channels 80 positioned in the transition support frame 14, as shown in FIGS. 2, 3 and 5. In one embodiment, a plurality of cooling channels 80 may be positioned in the transition support frame 14. The cooling channels 80 may be aligned with each other and may extend axially within the transition support frame 14. The cooling channels 80 may be may be formed as tubes within the transition support frame 14 or may be formed from open sided channels that form enclosed channels when the transition support frame 14 is attached to the transition duct body 12. The cooling channels 80 may include inlets 82 at an upstream end of the cooling channels 80. In one embodiment, the inlets 82 may be positioned generally orthogonal to the cooling channel 80. The cooling channels 80 may include outlets 84 at a downstream end of the cooling channel 80. In one embodiment, as shown in FIG. 3, the cooling channel 80 may have an outlet 84 in a downstream end 86 of the transition support frame 14.

In another embodiment, as shown in FIG. 4, the outlet 84 may be positioned to direct cooling fluids generally orthogonal to the transition support frame 14. The outlet 84 may be aligned with an orifice 88 in the transition duct 12. In this embodiment, cooling fluids may be exhausted into the hot gas flow path 50 to form a film cooling layer to prevent hot gases from entering the space between the exit rails 70, 74 and the turbine inlet 90. As shown in FIG. 4, a transition exit seal 16 may extend between the transition support frame 14 and the turbine inlet 90 to seal the gap between the two components.

Figure 6:
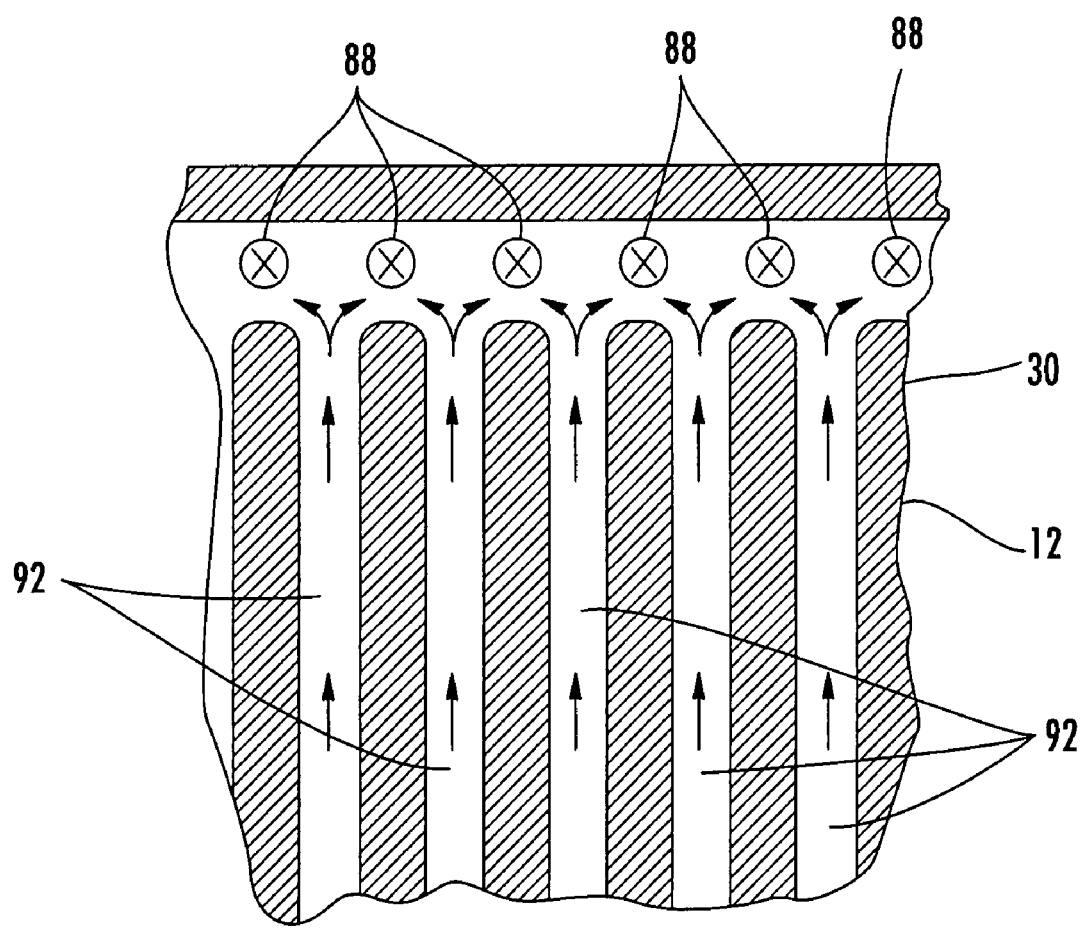
FIG. 6 is a partial cross-sectional view of the cooling system in the transition duct taken at section line 6-6 in FIG. 4.

The transition duct 12 of the transition duct support system 10 may include duct cooling channels 92. The duct cooling channels 92 may be configured to receive cooling fluids from a compressor discharge (not shown). The duct cooling channels 92 may be aligned with each other and generally aligned with the flow path 50 through the transition duct 12. The duct cooling channels 92 may be exhausted from the transition duct 12 through a downstream end 94 of the duct 12 to cool the space between the duct 12 and the turbine inlet 90. A gap 104 may be formed by standoffs 102 that enable cooling fluids to be exhausted from the transition duct 12 through a downstream end 94 of the duct 12 to cool the turbine inlet 90 and the space between the duct 12 and the turbine inlet 90 despite thermal distortion and subsequent creep effects of the transition duct 12 that may negatively impact the cooling fluid flow. In an alternative embodiment, as shown in FIGS. 4 and 6, the transition duct 12 may exhaust cooling fluids through one or more outlets 96 positioned to direct cooling fluids generally orthogonal to the transition support frame 14. In such an embodiment, the transition duct 12 may be formed from multiple layers of panels, wherein the duct cooling channel 92 may be formed by a channel cut into one layer that is positioned adjacent to another layer. As shown in FIG. 4, the transition duct 12 may be formed from two layers of panels. The transition duct 12 may be formed from, but is not limited to, sheet INCO 617, INCO 625, INCO 718, HAST-X, HAYNES 230, other nickel based alloys capable of diffusion bonding and other appropriate materials.

The transition duct support system 10 may be used to support the transition duct 12 in a more effective manner than in conventional designs. In particular, the transition duct 12 may be supported with the transition support frame 14. The transition support frame 14 may be attached to a support system of the turbine engine with mechanical connectors inserted through the orifices 72, 76 of the outer and inner exit rails 70, 74. The transition support frame 14 may be formed of two or more pieces. In the embodiment, in which the transition support frame 14 is formed of two halves, the transition support frame 14 may be attached around the transition duct 12 with mechanical fasteners, such as welds, bolts, or other appropriate devices. When a transition duct support system 10 and transition duct 12 are installed into a turbine engine, the transition duct support system 10 and the transition duct 12 may be preloaded such that the outer surfaces of one or more, if not all, of the first and second sidewalls 38, 40, the radially outer wall 42 and the radially inner wall 44 bear upon the first and second inner surfaces 18, 24, the radially outer frame wall 56 and the radially inner frame wall 62 of the transition support frame 14. The transition duct 12 and the transition support frame 14 may be attached to each other via welds, such as, but not limited to, intermittent stitch welds. In this configuration, the stresses that develop during use of the turbine engine may be distributed across the first and second inner surfaces 18, 24, the radially outer frame wall 56 and the radially inner frame wall 62 of the transition support frame 14 rather than being limited to the welds of conventional designs. Distributing the stresses across a larger area reduces the likelihood of failure of the welds and thereby increases the useful life of the transition support frame 14.

The transition duct support system may also limit the exposure of the transition support frame 14 to the combustion gases flowing through the transition duct 12. For instance, the outlet 36 of the transition duct body 12 may extend axially downstream from the transition support frame 14 such that the outlet 36 of the transition duct body 12 is positioned axially downstream from the transition support frame 14 to provide heat shielding of downstream transition exit seals 16.

The foregoing description is provided in the context of a few possible constructions of such a transition duct and associated turbine subsystem. Thus, it will of course be understood that the invention is not limited to the specific details described herein, which are given by way of example only, and that various modifications and alterations are possible within the scope of the invention as defined in the following claims.

We claim:

1. A transition duct support system for a transition duct that channels hot gases from a combustor exit to a gas turbine inlet of a turbine engine, comprising:
    a transition duct body formed from an outer wall that forms an internal passage extending between an inlet and an outlet of the transition duct body;
    wherein the transition duct body includes an outlet transition section at the outlet in which at least a portion of the outlet transition section formed from a first wall is positioned at an oblique angle relative to the outer wall of the transition duct body;
    a transition support frame formed from a body positioned around the transition duct body at the outlet transition section;
    wherein the transition support frame includes at least one inner surface aligned with and positioned proximate to the first wall forming the portion of the outlet transition section that is positioned at an oblique angle relative to the outer wall of the transition duct body to limit linear axial movement of the transition duct body in a first direction;
    wherein the outlet transition section forming the outlet transition section includes a second wall positioned at a second oblique angle relative to the outer wall of the transition duct body,
    wherein the at least one inner surface of the transition support frame includes a second inner surface aligned with and positioned proximate to the second wall of the transition duct body to limit movement in a second direction that is different than the first direction;
    wherein the first and second walls are nonparallel;
    wherein the first wall is a sidewall of the outlet transition section of the transition duct body and the second wall is a radially outer wall of the outlet transition section of the transition duct body;
    wherein the outlet transition section of the transition duct body further comprises a first sidewall formed from the first wall, a second sidewall opposite to the first sidewall, and a radially inner wall opposite the radially outer wall; and
    wherein the first sidewall and second sidewall diverge from upstream to downstream and the radially outer wall and radially inner wall converge from upstream to downstream.

2. The transition duct support system of claim 1, wherein the first wall of the outlet transition section of the transition duct body is positioned at the first oblique angle extending generally away from a longitudinal axis of a flow path of the transition duct body and the second wall of the outlet transition section of the transition duct body is positioned at the second oblique angle extending generally toward the longitudinal axis of the flow path of the transition duct body.

3. The transition duct support system of claim 2, wherein the radially inner wall is generally aligned with the outer wall of the transition duct body, and the radially outer wall is generally aligned with the outer wall of the transition duct body.

4. The transition duct support system of claim 2, wherein the second sidewall is positioned at an oblique angle relative to the outer wall of the transition duct body, the radially inner wall is generally aligned with the outer wall of the transition duct body, and the radially outer wall is generally aligned with the outer wall of the transition duct body.

5. The transition duct support system of claim 4, wherein the second sidewall extends at an oblique angle in a direction away from the first sidewall.

6. The transition duct support system of claim 1, wherein the outlet of the transition duct body extends axially downstream from the transition support frame such that the outlet of the transition duct body is positioned axially downstream from the transition support frame to provide heat shielding of downstream transition exit seals.

7. The transition duct support system of claim 1, further comprising a cooling system formed from at least one cooling channel in the transition support frame.

8. The transition duct support system of claim 7, wherein the at least one cooling channel extends axially along a radially inner surface of the transition support frame and includes at least one inlet in a radially outer surface.

9. The transition duct support system of claim 8, wherein the at least one cooling channel includes an outlet in an inner surface of the transition support frame.

10. The transition duct support system of claim 8, wherein the at least one cooling channel includes an outlet in an end surface of the transition support frame.

11. The transition duct support system of claim 7, further comprising at least one cooling channel extending along the transition duct body in the outer wall forming the transition duct body.

12. The transition duct support system of claim 11, wherein the at least one cooling channel extending along the transition duct body in the outer wall forming the transition duct body comprises a plurality of cooling channels axially aligned in the transition duct body and having outlets in an inner surface of the transition duct body aligned with orifices in the transition support frame.

13. The transition duct support system of claim 1, further comprising an outer exit rail coupled to and extending radially outwardly from a radially outer wall of the transition support frame and an inner exit rail coupled to and extending radially inwardly from a radially inner wall of the transition support frame, wherein the outer and inner exit rails are configured to support the transition support frame.

14. The transition duct support system of claim 1, wherein the portion of the outlet transition section positioned at an oblique angle is positioned at an oblique angle between 50 degrees and greater than zero degrees.

15. The transition duct support system of claim 1, further comprising at least one standoff that separates the transition support frame from the transition duct body to form at least one gap enabling cooling fluids to flow between the transition support frame and the transition duct body to cool the gas turbine inlet.

16. A transition duct support system for a transition duct that channels hot gases from a combustor exit to a gas turbine inlet of a turbine engine, comprising:
a transition duct body formed from an outer wall that forms an internal passage extending between an inlet and an outlet of the transition duct body;
wherein the transition duct body includes an outlet transition section at the outlet in which at least a portion of the outlet transition section is positioned at an oblique angle relative to the outer wall of the transition duct body;
a transition support frame formed from a body positioned around the transition duct body at the outlet transition section;
wherein the transition support frame includes at least one inner surface aligned with and positioned proximate to portion of the outlet transition section that is positioned at an oblique angle relative to the outer wall of the transition duct body to limit linear axial movement of the transition duct body in a first direction;
wherein the portion of the outlet transition section positioned at an oblique angle relative to the outer wall of the transition duct body is comprised of a first wall positioned at a first oblique angle relative to the outer wall of the transition duct body and a second wall positioned at a second oblique angle relative to the outer wall of the transition duct body,
wherein the at least one inner surface of the transition support frame comprises a first inner surface aligned with and positioned proximate to the first wall of the transition duct body to limit movement in the first direction and a second inner surface aligned with and positioned proximate to the second wall of the transition duct body to limit movement in a second direction that is different than the first direction;
wherein the first and second walls are nonparallel; and
wherein the first wall of the outlet transition section of the transition duct body is positioned at an oblique angle extending generally away from a longitudinal axis of a flow path of the transition duct body from upstream to downstream and the second wall of the outlet transition section of the transition duct body is positioned at an oblique angle extending generally toward the longitudinal axis of the flow path of the transition duct body and generally radially inward from upstream to downstream, and wherein the first inner surface of the transition support frame is positioned at an oblique angle extending generally away from a longitudinal axis of a flow path of the transition support frame from upstream to downstream and the second inner surface of the transition support frame is positioned at an oblique angle extending generally toward the longitudinal axis of the flow path of the transition duct body and generally radially inward from upstream to downstream.

17. The transition duct system of claim 16, further comprising a cooling system formed from a plurality of cooling channels in the transition support frame and configured to provide cooling fluids to at least one exit seal positioned downstream from the transition duct body and further comprising an outer exit rail coupled to and extending radially outwardly from a radially outer wall of the transition support frame and an inner exit rail coupled to and extending radially inwardly from a radially inner wall of the transition support frame, wherein the outer and inner exit rails are configured to support the transition support frame.

* * * * *